United States Patent [19]
Renzo et al.

[11] Patent Number: 5,308,284
[45] Date of Patent: May 3, 1994

[54] PROTECTIVE BELLOWS

[75] Inventors: Bernard Renzo, Nantes; Joel Breheret, Treillieres, both of France

[73] Assignee: Draftex Industries Limited, Edinburgh, Scotland

[21] Appl. No.: 985,602

[22] Filed: Dec. 3, 1992

[30] Foreign Application Priority Data

Dec. 3, 1991 [GB] United Kingdom ............. 9125658.6

[51] Int. Cl.$^5$ .......................... F16D 3/84; F16J 15/52
[52] U.S. Cl. ............................... 464/175; 277/212 FB
[58] Field of Search .................. 277/212 FB; 464/173, 464/175; 403/50, 51; 74/18, 18.1, 18.2

[56] References Cited

U.S. PATENT DOCUMENTS

| | | | |
|---|---|---|---|
| 3,248,955 | 5/1966 | Templeton | 403/51 X |
| 3,451,700 | 6/1969 | Smith | 277/212 FB X |
| 4,154,546 | 5/1979 | Merrick et al. | 277/212 FB X |
| 4,210,002 | 7/1980 | Dore | 464/175 |
| 4,392,838 | 7/1983 | Welschof et al. | 464/175 |
| 4,556,400 | 12/1985 | Krüde et al. | 277/212 FB X |
| 4,558,869 | 12/1985 | Grove et al. | 277/9 X |
| 4,559,025 | 12/1985 | Dore | 277/212 FB X |
| 5,015,002 | 5/1991 | Goodman et al. | 277/212 FB |

FOREIGN PATENT DOCUMENTS 2147062 5/1985 United Kingdom .

Primary Examiner—William A. Cuchlinski, Jr.
Assistant Examiner—Scott W. Cummings
Attorney, Agent, or Firm—Leydig, Voit & Mayer

[57] ABSTRACT

A protective bellows protects a universal joint driven by a shaft, such as forming part of the front wheel drive mechanism of a motor vehicle. The bellows has a collar with an interior annular rib which, on completion of the fitting process, locates in an annular groove in the shaft. During the fitting process, a tube is forced between the interior peripheral surface of the collar and the outer surface of the shaft, via a channel in the rib and a channel in the material of the inner end of the collar which grips the surface of the shaft. Grease is pumped into the interior of the bellows through this tube. Further channels extend through the rib and the adjacent material of the collar, and allow excess air pressure to be vented to atmosphere during and after the grease-filling operation.

6 Claims, 5 Drawing Sheets

PROTECTIVE BELLOWS

The invention relates to a protective bellows for encasing a mechanism connected to a shaft around the periphery of which an end collar of the bellows resiliently clamps itself, in which the inner peripheral surface of the collar is formed with a radially inwardly-directed formation which, during fitment of the collar onto the shaft, spaces part of the adjacent inner peripheral surface of the collar from the outer surface of the shaft but leaving a further part of the inner peripheral surface resiliently in contact with the outer surface of the shaft, at least one first channel extending in an axial direction through the radially inwardly directed formation, the radially-inward formation engaging a groove in the outer surface of the shaft on completion of the fitment.

Embodiments of the invention to be described in more detail below are protective bellows for protecting the transmission mechanism in motor vehicles, such as for protecting drive joints in front wheel drive transmission arrangements.

One such known arrangement is shown in FR-A-8701 595. A problem which can arise with the known arrangement is pressure build-up inside the bellows during fitting to the shaft.

In accordance with the invention, the known bellows is characterised by at least one second channel extending through the said further part of the inner peripheral surface of the collar, whereby at least the second channel vents the interior of the bellows to atmosphere during fitment of the bellows.

Protective bellows embodying the invention will now be described, by way of example only, with reference to the accompanying drawings in which.

Figure 1:
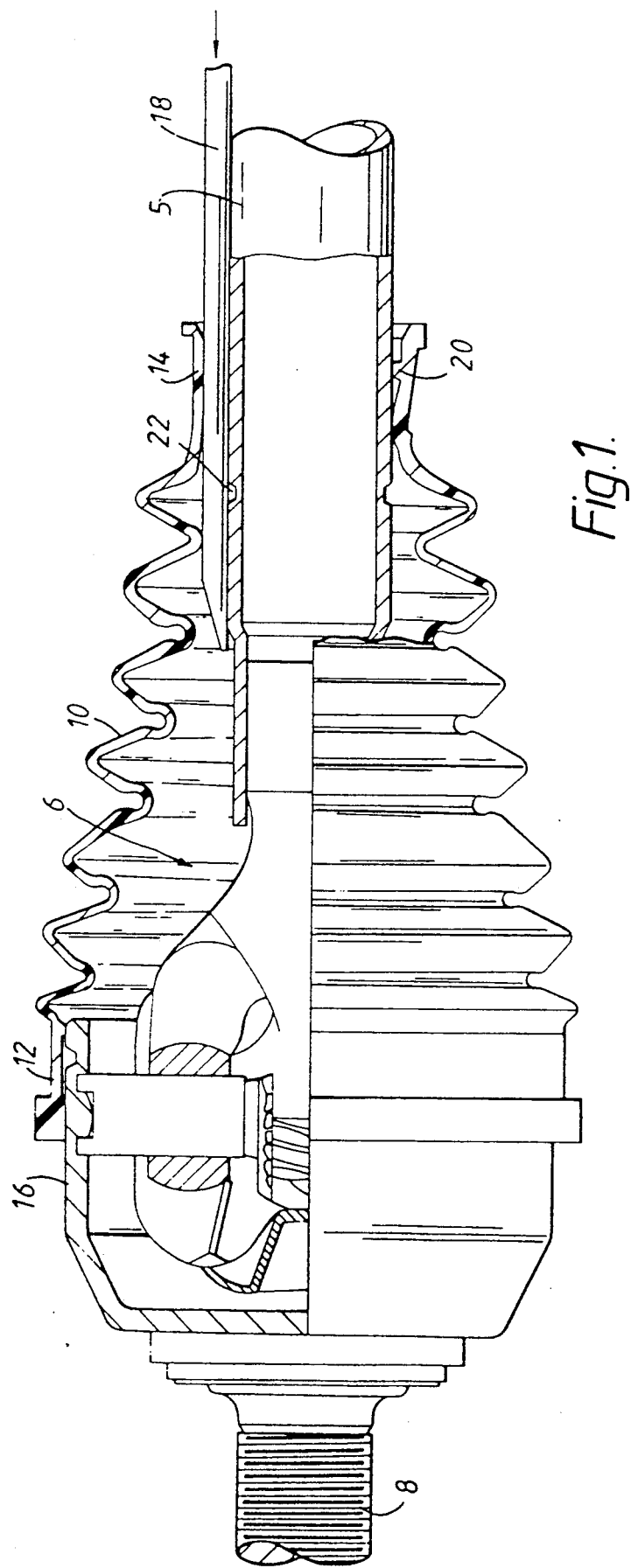
FIG. 1 is a diagrammatic cross-section through one of the bellows showing it partially fitted into position over a drive joint in a motor vehicle transmission system.

FIG. 1 shows a shaft 5 forming part of a front wheel drive transmission system of a motor vehicle. Shaft 5 takes the drive from the output of the vehicle's gear box (not shown) and connects it, via a universal drive joint 6, to an output shaft 8 connected to the front wheel of the vehicle. The drive joint 6 is protected by a flexible bellows 10 such as made of thermoplastic material. The bellows 10 is formed with collars 12 and 14 by means of which it is respectively clamped to the casing 16 of the drive joint 6 and to the outside of the shaft 5, the clamping action being performed by means of clamping rings (not shown) which clamp the collars to the respective circumferential surfaces.

Figure 2:
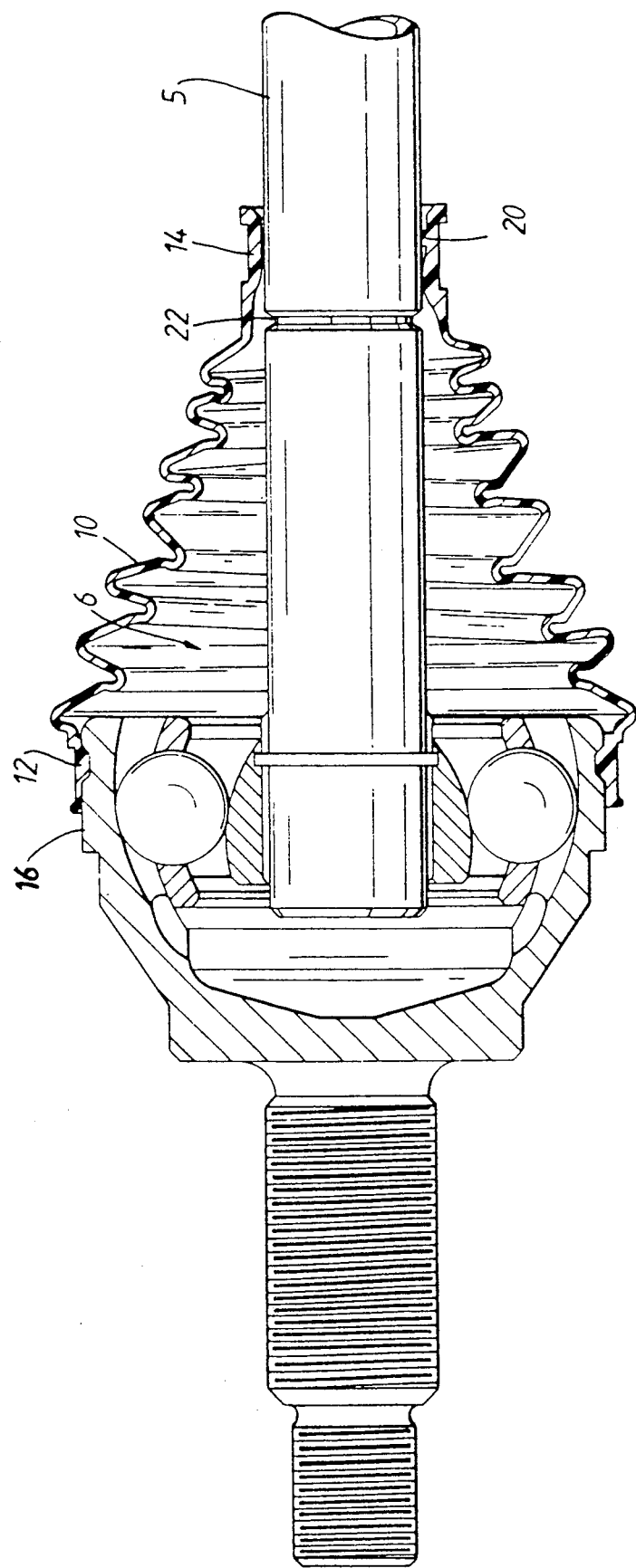
FIG. 2 is a diagrammatic cross-section through a slightly different form of the bellows, around a drive joint of a motor vehicle transmission system, showing the fitting operation.
Figure 3:
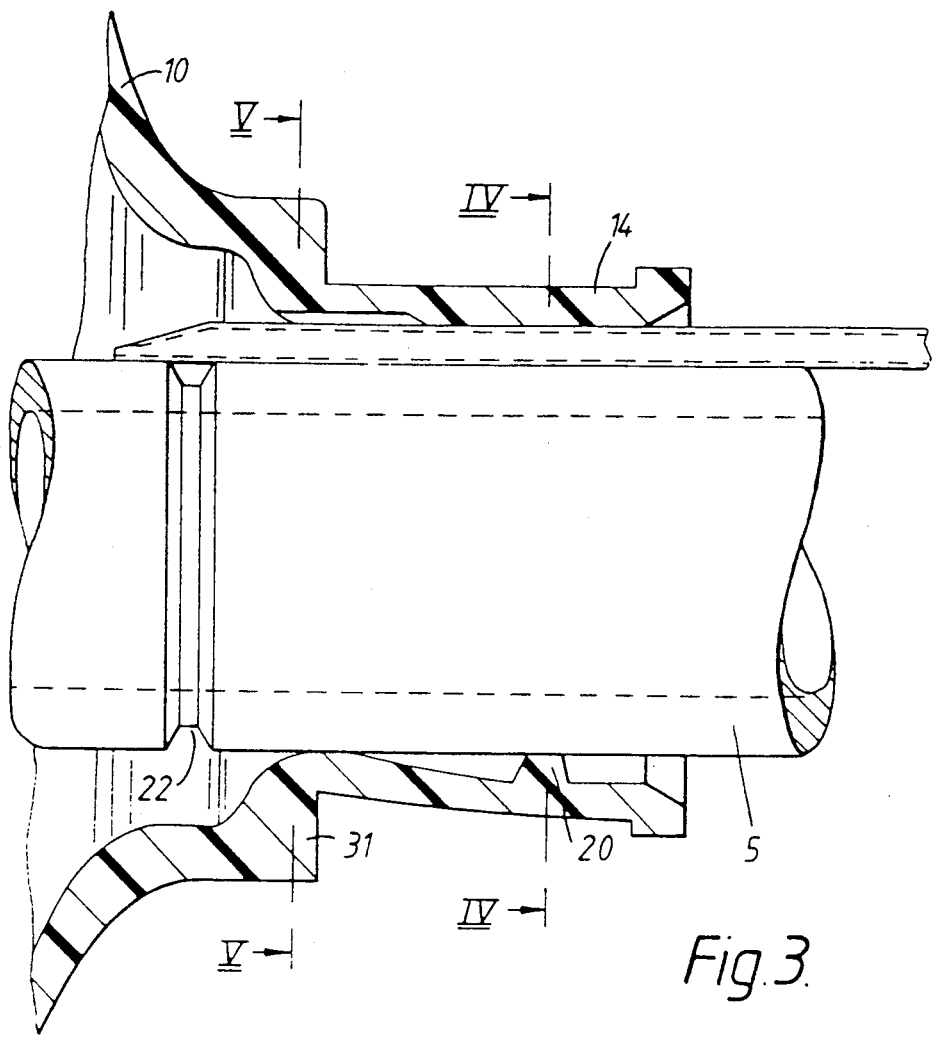
FIG. 3 is an enlarged cross-sectional view, taken on the line III—III of FIG. 4, of part of what is shown in FIG. 1.

During assembly of the bellows into position, its interior has to be filled or partially filled with grease. In the manner to be explained in more detail below, this is achieved via a tube 18 (FIG. 1) which is inserted between the outside of the shaft 5 and the inside surface of the bellows. During this filling operation, the collar 14 of the bellows is not in its final position on the shaft 5. After completion of the grease-filling operation, however, the tube 18 is removed (e.g. as shown in FIG. 2) and the bellows is partially compressed lengthwise by sliding the collar 14 to the left (as viewed in FIGS. 1 and 2) until a rib 20 becomes located in an annular groove 22 in the periphery of the shaft 5.

Figure 4:
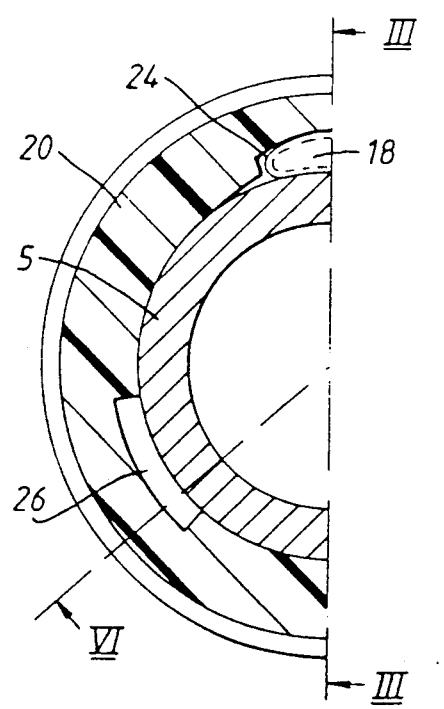
FIG. 4 is a half-section taken on the line IV—IV of FIG. 3.
Figure 5:
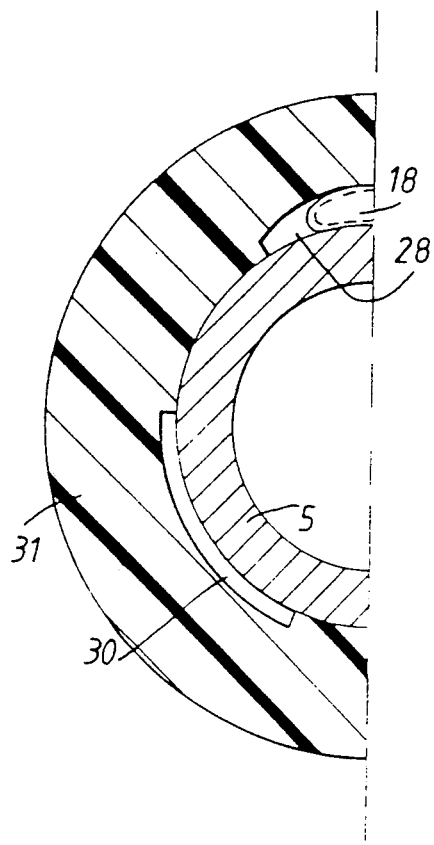
FIG. 5 is a half-section taken on the line V—V of FIG. 3.
Figure 6:
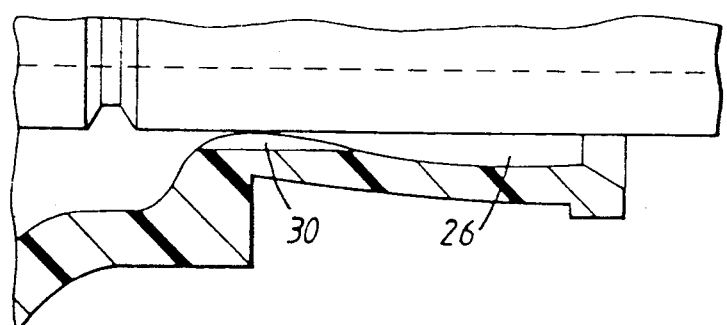
FIG. 6 is a partial cross-section taken on the line III-VI of FIG. 4.

As shown more clearly in FIGS. 3 to 6, and referring in Particular to FIG. 4, the rib 20 is generally annular but, in accordance with what is shown in French Patent No. 87.01595, is interrupted by an axially directed groove 24 through which the tube 18 may be inserted and at least one other similar groove 26 (FIGS. 4 and 6) is also provided through the annular rib. In accordance with a feature of the present invention, however, the material of the bellows collar 14 is provided with further grooves 28 and 30(FIGS. 5 and 6) (of equal or different width) through the material of the axially-inner end 31 of the collar 14.

During the grease-filling operation, the grease-filling tube 18 is inserted through the grooves 24 and 28 (FIGS. 1,4 and 5), and grease is pumped into the interior of the bellows. During this operation, the grooves 26 and 30 (FIGS. 4,5 and 6) provide an important function in allowing excess air within the interior of the bellows to exhaust, thus preventing the insertion of the grease into the bellows from increasing the air pressure within the bellows above atmospheric pressure. After completion of the grease-filling operation, the tube 18 is withdrawn, and the clamping collar 14 is slid along the shaft 5 to the left (as viewed in FIGS. 1 and 2), thus partially lengthwise-compressing the material of the bellows, until the rib 7 engages within the annular groove 22 in the shaft. During this operation, excess air pressure within the interior of the bellows can vent to atmosphere through the grooves 30 and 26. In this way, therefore, the grooves 26 and 30 (together with the grooves 28 and 24) prevent over-pressure in the interior of the bellows after the collar 14 has been clamped onto the shaft. The resilience of the material of the bellows is such that the material tightly grips the shaft 5 when the tube 18 is withdrawn. If the grooves 28 and 30 are not provided in the material of the axially inner end 31 of the collar 14, this material would press tightly round the shaft 5 and effectively seal off the interior of the bellows from the external atmosphere—even in spite of the channels 24 and 26. Excess pressure could thus build up in the bellows—which is avoided by the channels 28 and 30.

Figure 7:
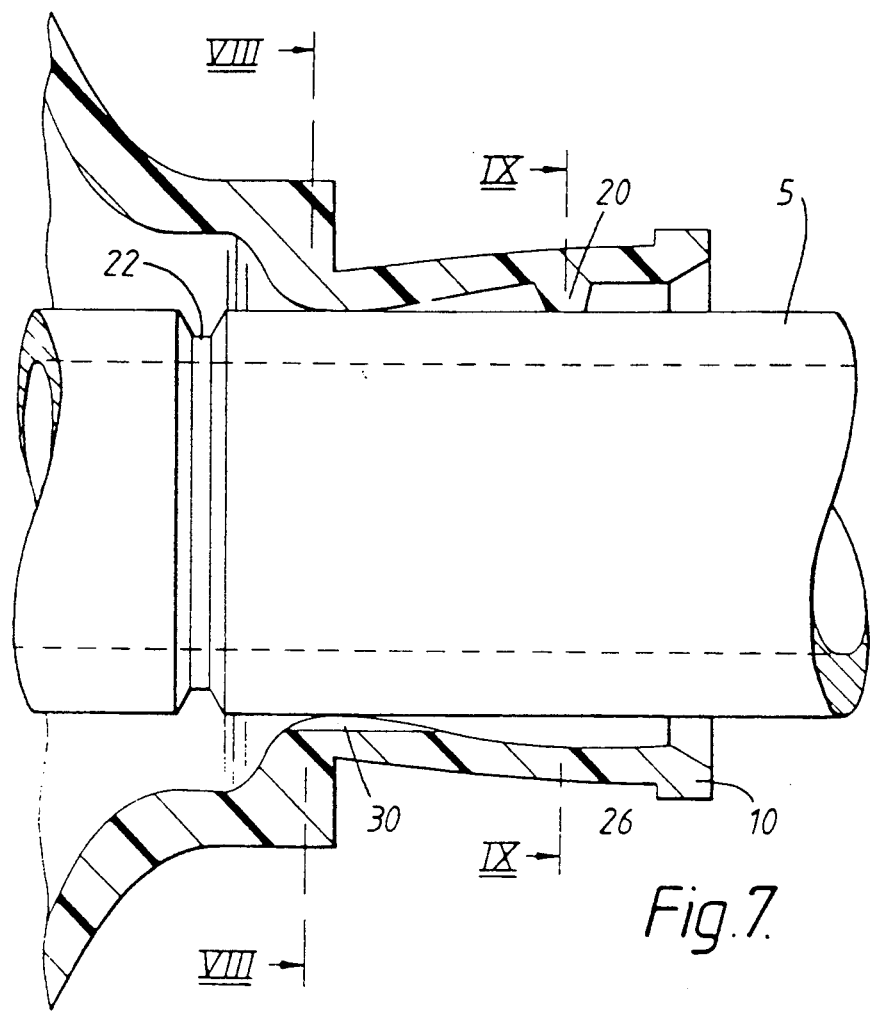
FIG. 7 is a cross-section of part of another of the bellows, during a stage in fitting it into position, and taken on the line VII—VII of FIG. 9.
Figure 8:
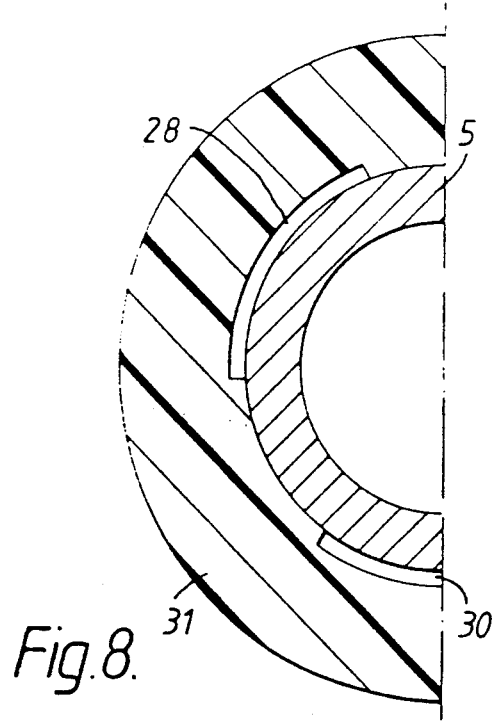
FIG. 8 is a half-section taken on the line VIII—VIII of FIG. 7.
Figure 9:
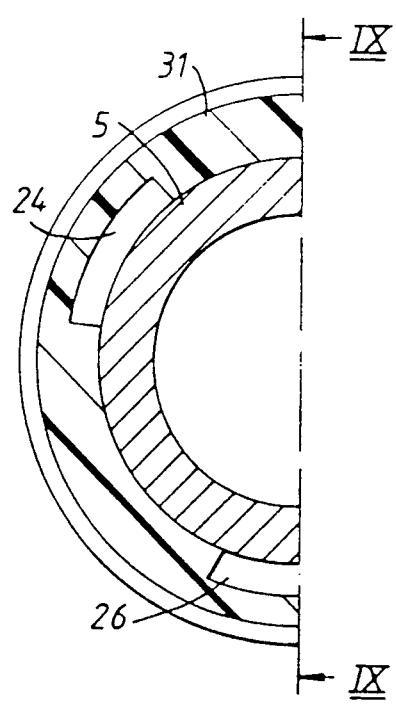
FIG. 9 is a half-section taken on the line IX—IX of FIG. 7.

FIGS. 7 to 9 show a slightly modified arrangement in which items corresponding to those in FIGS. 3 to 6 are correspondingly referenced.

What is claimed is:

1. A protective bellows for encasing a mechanism connected to an axially extending shaft around the periphery of which an end collar of the bellows resiliently clamps itself, comprising means on the collar defining an inner peripheral surface, the inner peripheral surface being formed, at a first axial position therealong with respect to the axis of the shaft, with a radially inwardly-directed formation which, during fitment of the collar onto the shaft, spaces part of the adjacent inner peripheral surface of the collar from the outer surface of the shaft but leaving a further part of the inner peripheral surface resiliently in contact with the outer surface of the shaft, the further part of the inner peripheral surface being at a second axial position along the inner peripheral surface which is spaced axially therealong from the said first axial position, means defining at least one first channel extending in an axial direction through the radially inwardly-directed formation, and means defining at least one second channel through the said further part of the inner peripheral surface of the collar, whereby the channels vent the interior of the bellows to atmosphere during fitment of the bellows, the radially-inward formation being adapted to engage a groove in the outer surface of the shaft on completion of the fitment.

2. A bellows according to claim 1, in which the radially inwardly-directed formation is a rib extending annularly except where interrupted by the or each first channel.

3. A bellows according to claim 2, in which the rib is interrupted by a plurality of said first channels and in which there are a plurality of the second channels.

4. A bellows according to claim 3, in which one of the first channels and one of the second channels together form a passageway for insertion of a tube between the inner peripheral surface of the collar and the outer surface of the shaft and by means of which grease can be inserted into the interior of the bellows, the interior of the bellows being vented to atmosphere during this process via another of the second channels and another of the first channels.

5. A protective bellows for protecting a drive joint connected to a drive shaft in a front wheel drive transmission of an automobile, comprising means on the bellows defining an end collar for clamping the bellows to the drive shaft, means on an inner peripheral surface of the collar defining an inwardly directed rib extending annularly from a first predetermined axial position on the surface of the collar, the rib being interrupted by at least two first channels extending in an axial direction with reference to the collar, the rib being sized to locate in an annular groove in the outer surface of the shaft when the bellows is finally fitted in position but engaging a part of the outer surface of the shaft during the fitting operation which is axially spaced from the groove and consequently spacing the corresponding axial part of the inner peripheral surface of the collar away from the outer surface of the shaft but with a second part of the inner peripheral surface of the collar at a second predetermined axial position resiliently engaging the outer surface of the shaft, and means defining a plurality of second channels through the said second part of the inner peripheral surface of the collar, whereby, during the fitting operation, grease may be pumped into the interior of the bellows through a tube inserted through one of the first channels and one of the second channels, and air displaced by the grease from the interior of the bellows may be vented to atmosphere by another of the first channels in the surface of the collar and another of the second channels in the annular rib.

6. A protective bellows for encasing a mechanism connected to an axially extending shaft around the periphery of which an end collar of the bellows resiliently clamps itself, comprising means on the collar defining an inner peripheral surface formed with a radially inwardly-directed rib which, during fitment of the collar onto the shaft, spaces part of the adjacent inner peripheral surface of the collar from the outer surface of the shaft, but leaving a further and axially-spaced part of the inner peripheral surface resiliently in contact with the outer surface of the shaft, means defining a plurality of first channels each extending in an axial direction through the rib so that the rib extends annually except where interrupted by each first channel, and means defining a plurality of second channels through the said further part of the inner peripheral surface of the collar, whereby one of the first channels and one of the second channels together form a passageway for insertion of a tube between the inner peripheral surface of the collar and the outer surface of the shaft and by means of which grease can be inserted into the interior of the bellows, the interior of the bellows being vented to atmosphere during this process via another of the second channels and another of the first channels, the rib being adapted to engage a groove in the outer surface of the shaft on completion of the fitment.

* * * * *